Oct. 27, 1942.　　　　E. C. LAMPSON　　　　2,300,297
MATRIX MAKING MACHINE
Filed Jan. 31, 1940　　　　7 Sheets-Sheet 2
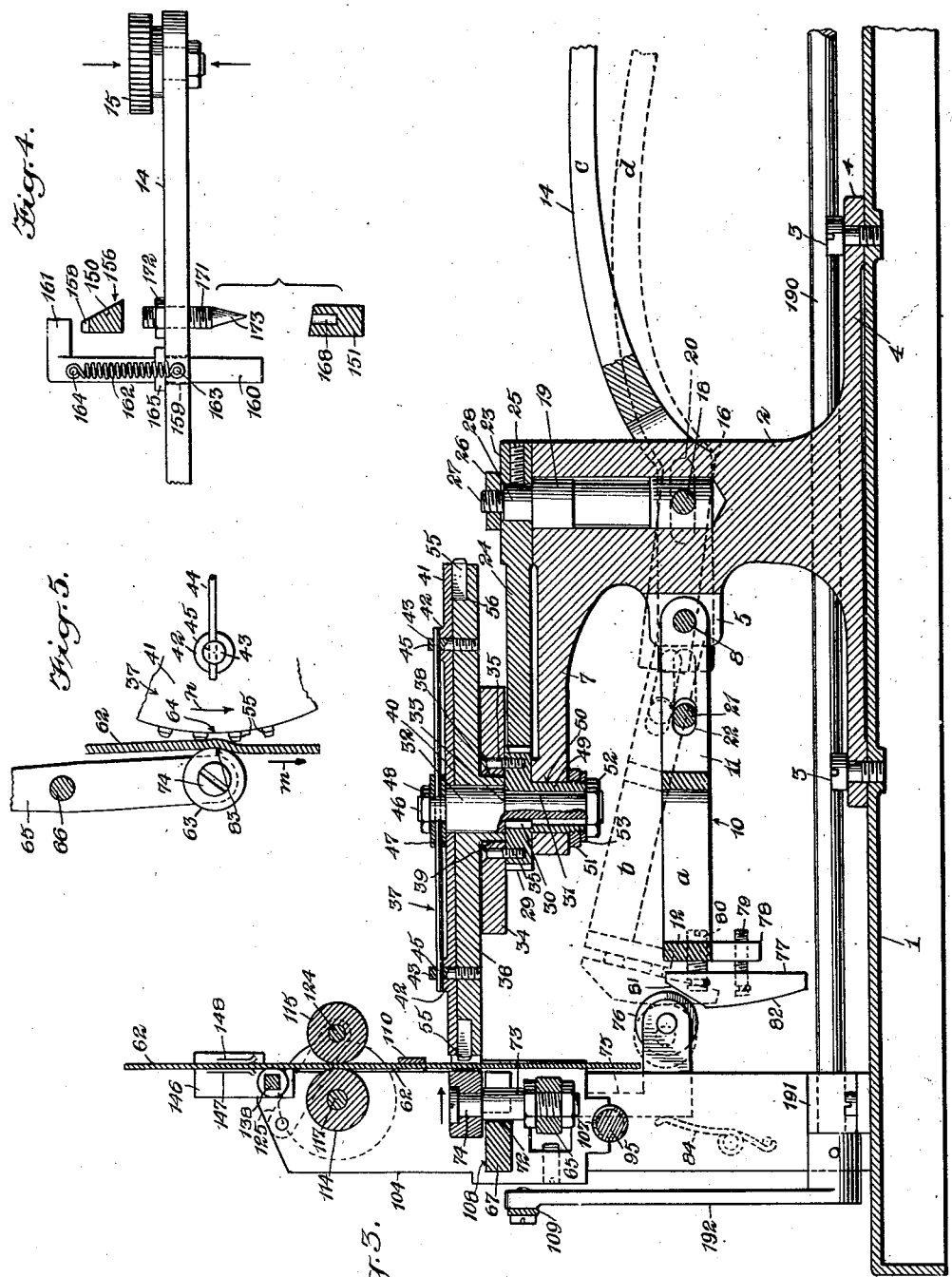
INVENTOR
Edward C. Lampson
BY
ATTORNEYS

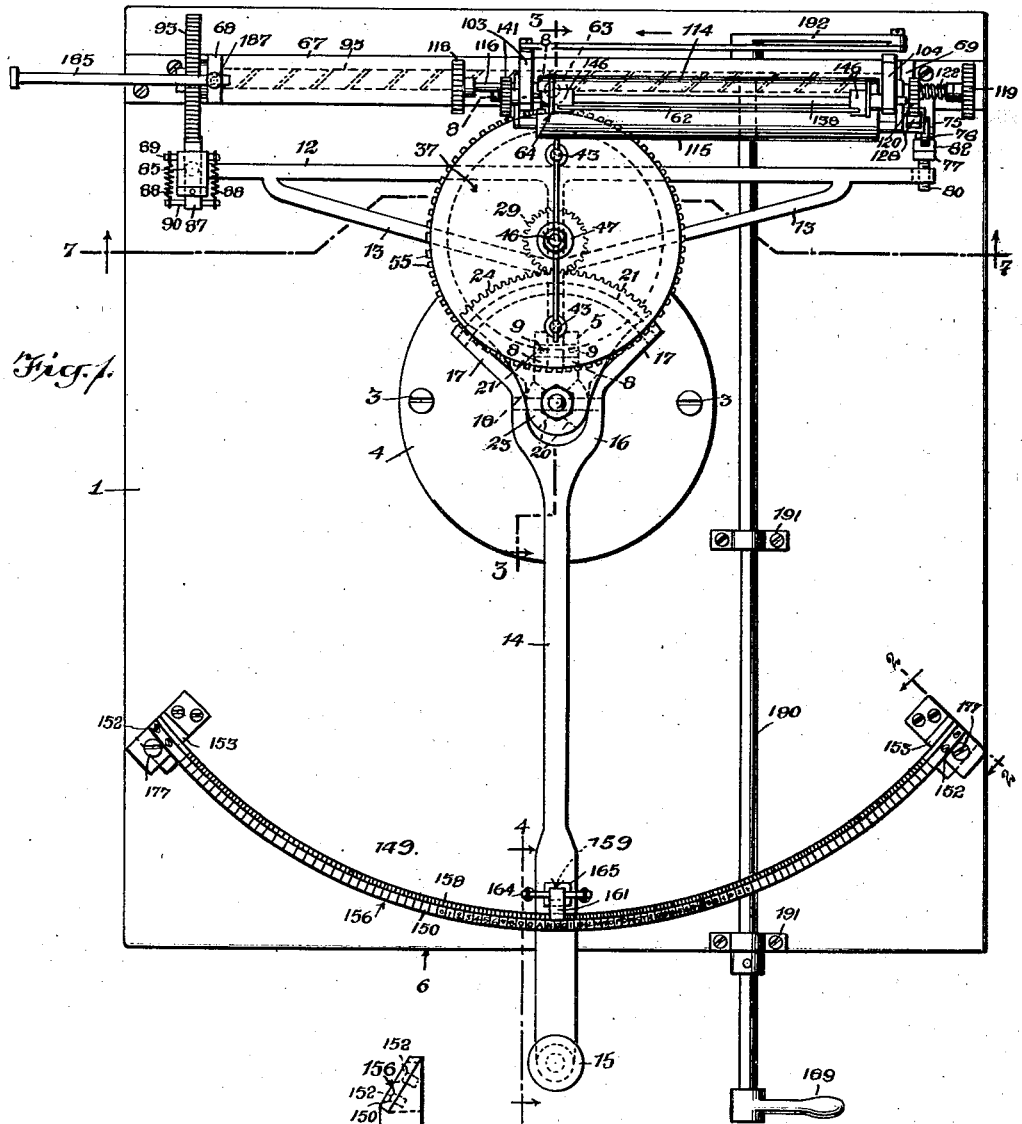

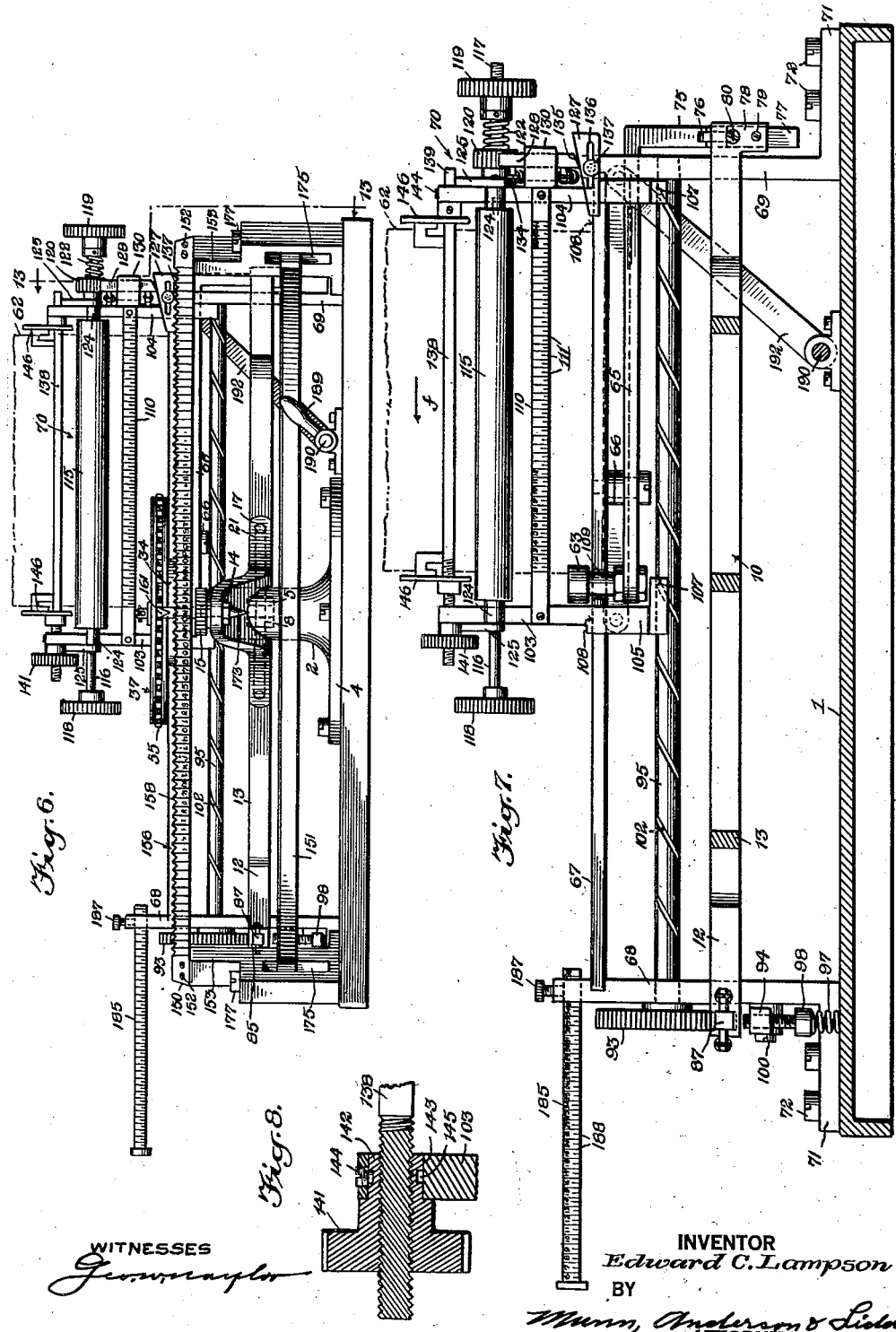

Oct. 27, 1942.    E. C. LAMPSON    2,300,297
MATRIX MAKING MACHINE
Filed Jan. 31, 1940    7 Sheets-Sheet 4
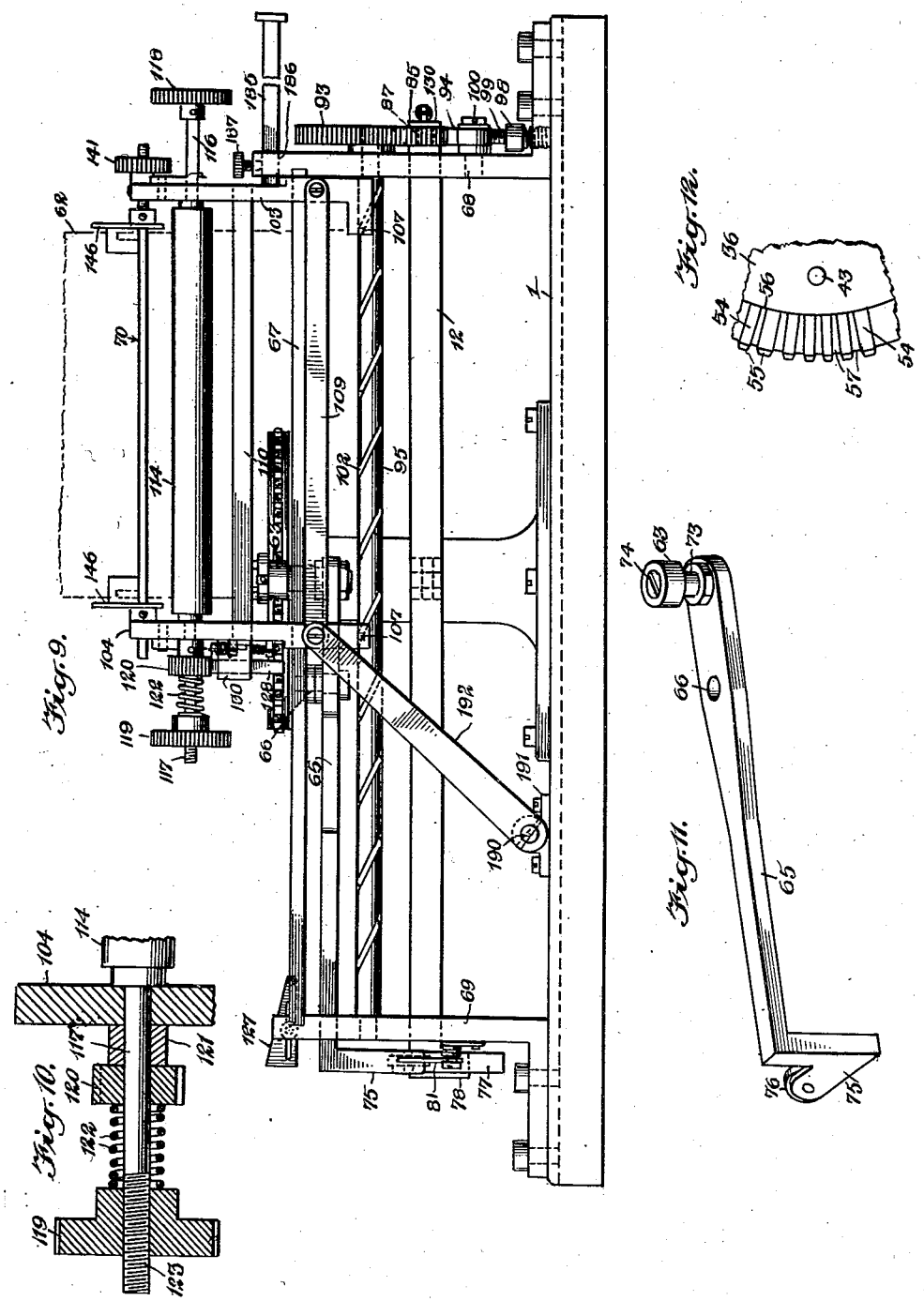
INVENTOR
Edward C. Lampson
BY
Munn, Anderson & Liddy
ATTORNEYS Oct. 27, 1942.        E. C. LAMPSON        2,300,297
MATRIX MAKING MACHINE
Filed Jan. 31, 1940        7 Sheets-Sheet 5
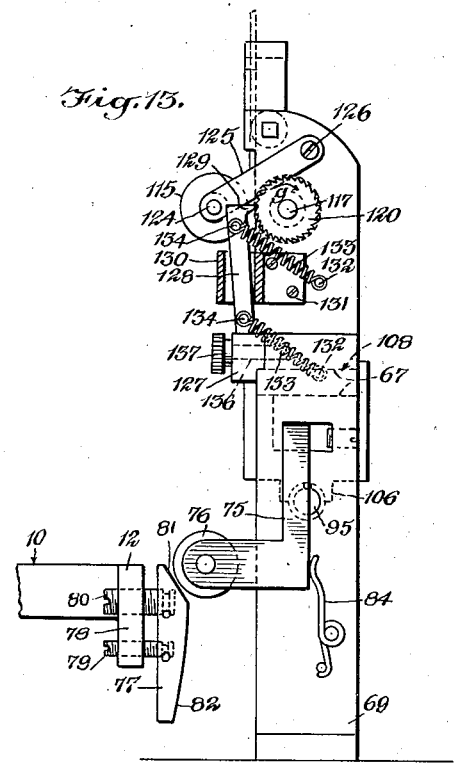
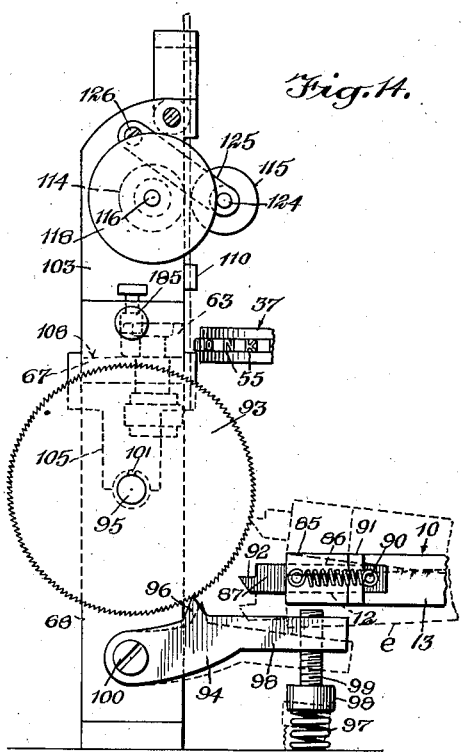
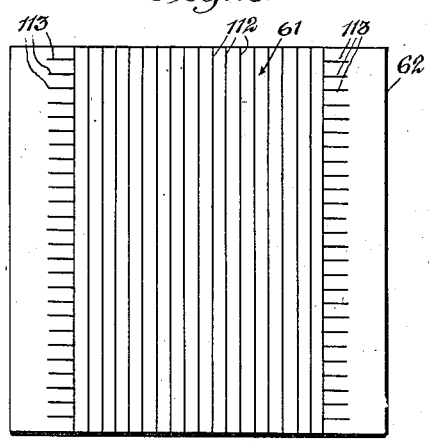
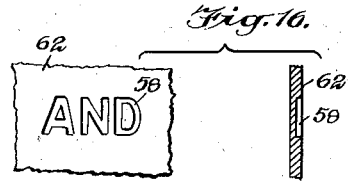
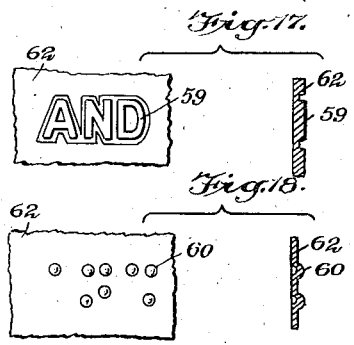
WITNESSES
INVENTOR
Edward C. Lampson
BY
ATTORNEYS Oct. 27, 1942.                E. C. LAMPSON                2,300,297
                           MATRIX MAKING MACHINE
                           Filed Jan. 31, 1940           7 Sheets-Sheet 6

WITNESSES

INVENTOR
Edward C. Lampson
BY
Munn, Anderson & Liddy
ATTORNEYS

Oct. 27, 1942.　　　　E. C. LAMPSON　　　　2,300,297
MATRIX MAKING MACHINE
Filed Jan. 31, 1940　　　　7 Sheets-Sheet 7
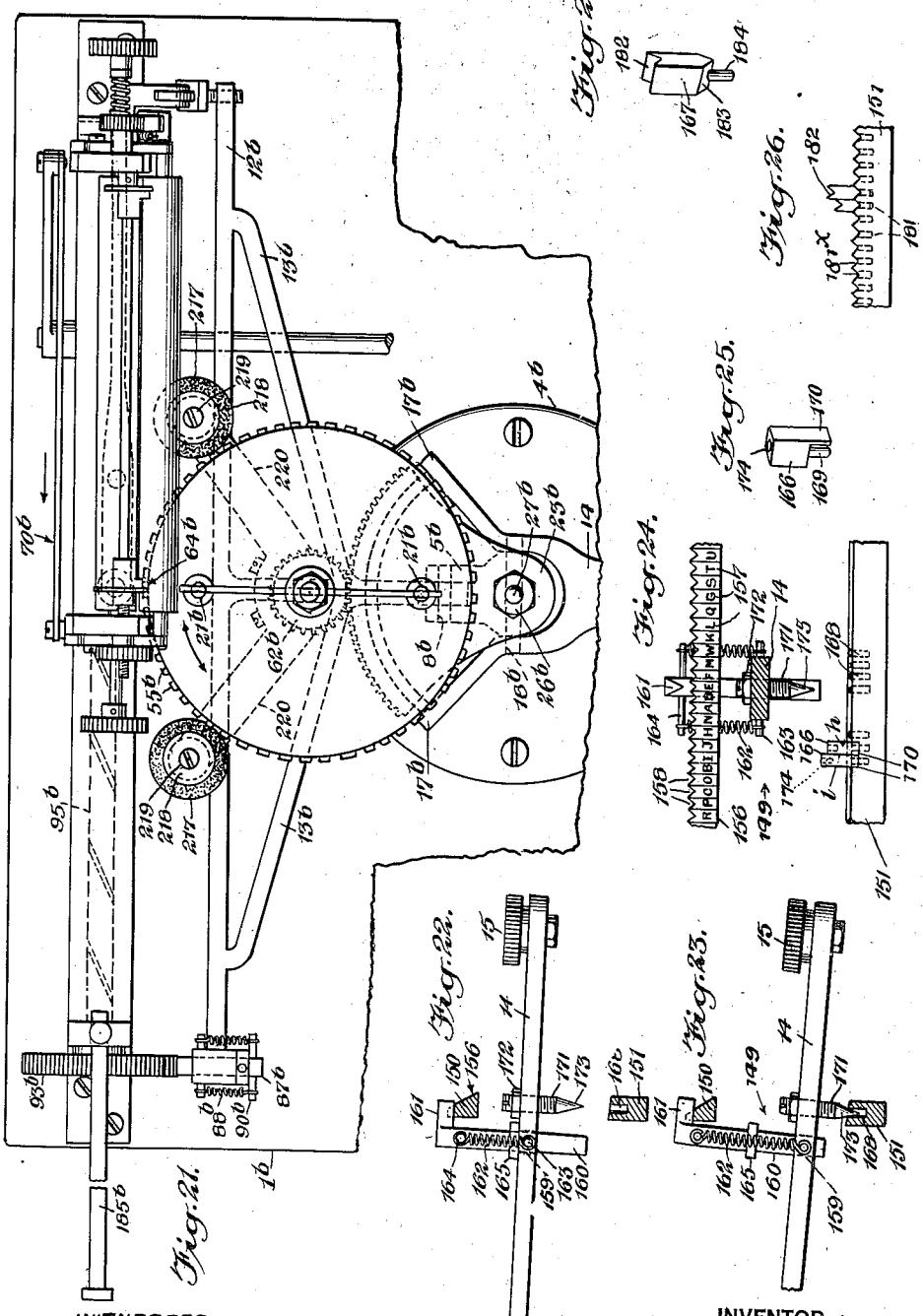
WITNESSES
INVENTOR
Edward C. Lampson
BY
ATTORNEYS Patented Oct. 27, 1942

2,300,297

UNITED STATES PATENT OFFICE 2,300,297

MATRIX MAKING MACHINE

Edward C. Lampson, Jefferson, Ohio

Application January 31, 1940, Serial No. 316,661

31 Claims. (Cl. 197—6.4)

This invention relates to an improvement in the making of matrices for type-casting. By an extension of this fundamental idea the principles of the invention can be devoted to the making of matrices for the casting of printable characters other than type. But in order to emphasize the primary use of the invention, this description is confined to the manufacture of a type matrix, the only exceptions occurring in the description of those modifications which comprise a logical change in the structure for purposes analogous to the formation of said matrix.

In order to lend emphasis to the simplicity and utility of the instant machine, it is desired to briefly review the prevailing mode of making a matrix for newspaper and similar work. The customarily known matrix consists of a dry mat known as a stereotype mat to those acquainted with the art, which consists of a sheet of an appropriate composition which will yield to the heavy pressure put upon it in the formation of the matrix, and later in the process will withstand the hot metal poured against it in casting. Although this mat is commonly called a "dry" mat, it actually carries a degree of moisture which is a necessary asset to the yielding which must occur when the pressure is applied as stated.

The type is set up either by hand or by a typecasting machine and is locked in a form. The stereotype mat is superimposed upon the type faces and the combination of the type form and mat are subjected to sufficient pressure to force the mat into all of the interstices of the type form so that the resulting matrix comprises a positive copy of the intellectual matter to be reduced to print. Said mat is then introduced into a casting machine wherein hot metal is poured against it to produce a negative form which comprises the entire type set-up.

It is also known to those acquainted with this art that the operation of producing the type slugs in a type-casting machine involves very much mechanism. The individual type characters as released by the act of the operator, are manually or mechanically justified after a series of the characters is released to produce the nearest measurement to a line of type of column or other width, whereupon said series of characters is moved over to the casting position whereat the pouring or forcing of a quantity of hot metal thereupon produces the ultimate slug. Numbers of these slugs are locked into the form mentioned before, and from there on the stereotype mat is made as stated, the latter being followed by the final casting operation which produces a cast plate of printable type.

It is with the view to eliminating a large number of the acts incidental to the above process, as well as to avoiding the great costs which are attached to the purchase and maintenance of the machinery necessary to the foregoing that the instant machine has been devised. Said machine can be made and sold at a relatively low cost, comparable to that of an ordinary good typewriter, and for that reason will be available to a large number of persons in the printing trade who have need for a contrivance such as this which will enable the production of straight lines of type for plain columnar printing. With this preface in mind the objects of the invention are as follows:

First, to provide a simple but entirely effective machine for use in high composition, wherein a type character or characters are impressed by rolling and not percussion directly upon or into the surface of a suitable substance, for example a prepared stereotype mat, the resultant matrix or mold being adaptable to a subsequent mechanical casting process for the production of the intended character or characters in printable form.

Second, to provide a machine which is somewhat similar to an ordinary typewriting machine in its general aspects, in that it includes a movable carriage, a platen and an arrangement for impressing a type character or characters, one of the distinguishing features being the adaptability of the instant machine to a prepared stereotype mat into which the characters are impressed in sunken form by a rolling action on the principle of typing off a line of writing, said mat being directly useable as a casting matrix upon its withdrawal from the machine generally without any further treatment.

Third, to provide a type element which is first turnable to cause the registration of a selected character with the printing position in front of the roller abutment, whereupon said type element is made to partake of an additional turn in combination with the forward movement of the carriage independently of the lever which initially actuated both said element and the carriage, and after said abutment had been moved up to make the imprint thereby to roll the complete impression into the mat.

Fourth, to provide a machine of the foregoing kind wherein the impression is produced mainly by forcing the matrix or stencil material to pass through a gap narrower than the material is thick so that the type face, which comprises one side of the gap, is pressed into said material thus forming a mold for subsequent casting.

Fifth, to provide a matrix making machine wherein the justification of the type is accomplished at will on the point system, in other words, a machine wherein the carriage may be moved different distances at the will of the operator for successive printable characters, thus to regulate the carriage movement to all widths of the type faces.

Sixth, to provide a machine of the character described, the principles of which are applicable to the production of printing upon materials other than a stereotype mat, for example, the machine can be used for making stencils on paper, wax, metal or a suitable composition; by changing the faces of the type elements so that the indicia are sunken the machine can be employed as an embossing machine, or by adding an appropriate inking device said machine will perform as a typewriter.

Other objects and advantages will appear in the following specification, reference being had to the accompanying drawings, in which:

Figure 1 is a plan view of the matrix making machine.

Figure 2 is a cross section taken on the line 2—2 of Fig. 1.

Figure 3 is a longitudinal section taken on the line 3—3 of Fig. 1.

Figure 4 is a longitudinal section taken on the line 4—4 of Fig. 1.

Figure 5 is a diagram illustrating the act of rolling in the type impression.

Figure 6 is a front elevation of the machine.

Figure 7 is a cross section taken on the line 7—7 of Fig. 1, the carriage as well as its associated parts being shown in elevation.

Figure 8 is a detail section taken on the line 8—8 of Fig. 1, illustrating a micrometer adjustment.

Figure 9 is a rear elevation of the machine.

Figure 10 is a detail sectional view of the back roller adjustment.

Figure 11 is a perspective view of the abutment lever.

Figure 12 is a detail view of a portion of the turnable type element illustrating some of the types and spacing blocks.

Figure 13 is a vertical section taken substantially on the line 13—13 of Fig. 6.

Figure 14 is an elevation of a portion of the left end of the machine, particularly illustrating the operation of the actuating dog.

Figure 15 is an elevation of a sheet of stereotype material hereinafter identified as the mat, particularly illustrating a mode of ruling the working surface.

Figure 16 is an elevation and a cross section of a portion of the mat illustrating the type impression in sunken form.

Figure 17 is an elevation and section of a portion of the mat illustrating the type impression in raised form.

Figure 18 is an elevation and section of a portion of the mat illustrating the making of raised characters in Braille type.

Figure 21 is a plan view of a part of a matrix making machine further modified to enable the making of characters as on the principle of a typewriter so as to be easily read.

Figure 22 is a partially sectional and elevational view on the order of Fig. 4, illustrating the initial occurrence upon depressing the key.

Figure 23 is a partially sectional and elevation view illustrating the final occurrence upon said depression of the key.

Figure 24 is a partially sectional and elevational view particularly illustrating the upper and lower guides.

Figure 25 is a detail perspective view of one of the inserts to be used in conjunction with the lower guide.

Figure 26 is a detail view of a modification of the lower guide.

Figure 27 is a perspective view of a type of the inserts adapted to be used in conjunction with the lower guide in Fig. 26.

Figure 19:
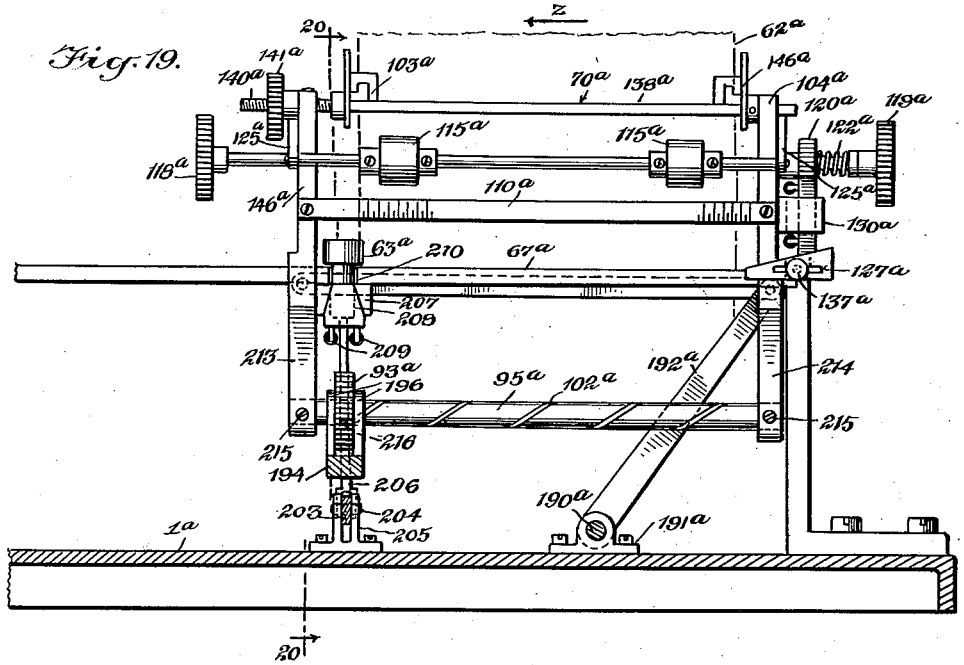
Figure 19 is a partially elevational and sectional view of a matrix making machine embodying some structural simplifications, the type element being omitted.

In carrying out the invention provision is made of a base 1 which is of a generally rectangular form (Fig. 1) but conceivably of any other shape that will be adaptable to the mechanism which it carries. In the approximate center of this base there is a standard 2 (Fig. 3) which is made rigid by screws 3 or their equivalents which fasten the standard flanges 4 down upon the base. Said standard has a forked extension 5 (Fig. 1) approximately half way of its height and directed rearwardly (away from the operator who will occupy a position adjacent to the front edge 6 of the base), and an arm 7 (Fig. 3) which extends in the same direction as the fork 5, but is considerably longer.

The forked extension 5 carries a pin 8 which is preferably secured at its ends in the fork by cross pins 9 (Fig. 1). The pin 8 thus comprises a stationary pivot and it is upon this pivot that a lever 10 is swingably mounted. This lever is swingable vertically approximately to the extent denoted by the full and dotted line positions a, b, (Fig. 3). Said lever comprises the central stem 11, one end of which makes the actual pivotal connection with the extension 5 at the pin 8, the other end of which merges into a transverse bar 12 (Fig. 1), the length of which is almost equal to the breadth of the base 1. Braces 13 joined to the stem 11 and the virtual extremities of the bar 12 make a rigid unit of the lever 10 which is adapted to respond as a unit when the actuating lever 14 is worked in the manner described below.

Said lever, which constitutes the selecting means, has a key 15 on its forward extremity (Fig. 1). This key is adapted to be grasped by the operator for the purpose of swinging the lever 14 laterally in the making of a type selection. Thereupon it is adapted to be depressed for the purpose of making the impression of the selected type in the working face of a mat. As brought out herein the term "mat" is to be regarded in its broad sense as consisting not only of paper or similar flong used in stereotyping, but also any other sheet upon which a legible character is adapted to be impressed, imprinted or embossed. For these purposes the lever 14 includes a hub 16 (Fig. 1) of forced formation to straddle the standard 2. The components 17 of the forked hub flare rearwardly from a position slightly beyond that of a pivot pin 18 on which the lever is adapted to be swung approximately between the full and dotted line positions c, d, (Fig. 3).

The pivot pin 18 is fixed at its middle crosswise of a shaft 19 which is erect in respect to the base 1, because it occupies the axial position of the standard 2. The ends of the pin 18 extend from the sides of the shaft 19 through slots 20 in opposite sides of the standard 2, the extremities of the pin then serving as trunnions on which the hub 16 is swingable in the manner stated. The extremities of the flared components 17 are connected by an arcuate bridge 21, the curvature of which is struck from the axis of the shaft 19 as the center. Said bridge occupies a slot 22 in the central stem 11 of the lever 10, from which circumstances it is readily evident in Fig. 3 that when the lever 14 is depressed to the dotted line position $d$ with a corresponding swinging of its hub 16 on the pivot pin 18, the bridge 21 will lift the lever 10 to its dotted line position $b$ by a swinging on the pin 8.

A selective turning of the lever 14 also occurs in the operation of the machine as mentioned above. Every turning movement is imparted to the shaft 19 by virtue of the pin 18, but the lever 10 is not disturbed by the act of turning because the arcuate bridge 21 rides freely in the slot 22. The hub 23 of a gear segment 24 is secured to the shaft 19 in any desired way, for example, by a set screw 25 and a lock nut 26. The latter is screwed onto the threaded terminal 27 of a reduced extension 28 of the shaft.

The quadrant 24 meshes with a gear 29 which is keyed at 30 (Fig. 3) to the reduced end 31 of a shaft 32. The reduction defines a shoulder 33 which rests upon the gear 29. The gear 29 has a disk 34 secured to it by screws 35 or equivalent means. The purpose of the disk 34 is to provide a large bearing surface for the type holder 36 of a type element generally designated 37. The holder 36 has a sleeve terminal 38 which occupies the bore 39 of the disk 34.

The shaft 32, in turn, occupies the bore 40 of the holder 36 and extends a sufficient distance thereabove to come flush with a cover plate 41. The latter has bosses 42 at diametrical points, through which the ends of pins 43 protrude a sufficient distance to receive the extremities of a stout spring wire 44 which transfixes said ends of the pins through small holes 45 provided for the purpose. The pins 43 are rigidly set in the type holder 36 and in a sense they key said holder and the cover plate 41 together. The center of the spring wire 44 occupies a hole which extends commonly through the small tip 46 of the shaft 32, and a heavy washer 47 which is emplaced upon said tip so as to both ride the exposed extremity of the shaft 32 as well as the adjoining surface of the cover plate 41. Of course pin 48 thrust through the tip 46 holds the shaft and spring assemblage firmly together.

Thus far it can be seen that a turn of the gear segment 24 in either direction will correspondingly turn the gear 29. Tracing this motion to the shaft 32 it will be understood that the stout spring wire 44 will serve to transmit the driving force to the type element 37. Thus the shaft 32 and the type element 37 initially turn as a unit, but later in the operation when the time for the essential rolling-in motion arrives, the type element 37 is adapted to turn on the shaft 32 independently of the gear 29 which, at that time, will be locked by the then stationary gear segment 24. Although the spring wire 44 is stout, yet at this moment it will yield, permitting the relative movement described.

Reverting to the reduced end 31 it is seen that this occupies a bore in the gear 29 which extends into an extension sleeve 49 pendent from the gear. Said sleeve is turnable in a bore 50 at the end of the arm 7. The latter provides a bearing for the gear 29, in fact for the entire type element assemblage, the latter being held emplaced on the arm by a nut 51 which is screwed onto the sleeve 49 as well as a nut 52 on the extremity of the reduced end 31, said nut bearing against a washer 53, as shown.

At this point it is desired to explain that the specific bearing structure for the type element assemblage is not necessarily adhered to. Said assemblage can be supported upon the arm 7 without involving the use of the sleeve 49 or other minor parts included in the description incident thereto. This provision for variation also extends to the types 54. These types are of any ordinary kind, and in any event they include the type faces 55 which stand exposed beyond the peripheries of the holder 36 and cover plate 41. One mode of emplacing the types 54 is to set them in radial positions in the circumferential rabbet 56 (Fig. 12) and to secure them in place by blocks 57 which not only comprise spacers, but wedges as well.

In actual practice the type faces 55 may be applied to the periphery of the type element 37 in any desired way. In lieu of using individual types, the periphery of the type element may have the faces formed thereon directly and integrally. A type face of this character will produce a recessed impression 58 (Fig. 16). Instead of embossing the periphery with raised characters, the latter may be engraved in the type element so as to produce raised impressions 59 (Fig. 17). On the same principle the raised characters 60 (Fig. 18) may be in Braille type to be read by blind persons. From this it will be understood that the specific manner of emplacing the type faces 55 (Figs. 3 and 12) is not to be regarded as a limitation.

Reference has been made to the rolling-in act whereby the type faces 55 (Fig. 3), whether embossed as shown or engraved into the periphery of the type element 37, are impressed into the working face 61 of the mat 62 (Fig. 15). This rolling-in act is essential because the requisite power could not be obtained by a percussive movement, as in a known typewriter, certainly not with that degree of uniformity which will be supplied by the instant arrangement. The latter provides for the formation of characters in the mat 62 at an absolutely uniform depth (or height) in reference to the working face 61. This is essential in the event of the mat being used for stereotyping work because the ultimately cast lines of type must be the same in height so as to insure uniform printing.

This result is achieved largely by the roller abutment 63 (Figs. 1, 3 and 11). This abutment is located at the impression or printing point 64 (Fig. 1) directly behind the mat 62 (Fig. 3). It is carried by an abutment lever 65 which is pivoted at 66 to a bar 67 which spans the distance between a pair of headers 68, 69. The bar 67 comprises a track for the carriage which is generally designated 70. It is secured to the headers 68, 69, in any preferred way so as to make a rigid construction, and said headers are secured to the base 1 by flanging them at 71 and driving screws 72 through as plainly shown in Fig. 7, thus establishing the foundation of a frame for a movable carriage.

The pivot 66 of the lever 65 may merely comprise a screw pendent from the bar 67. The latter is either slotted or cut in at 72 (Fig. 3) from the front edge a sufficient distance to accommodate the stem 73 which carries the roller abutment. The actual carrying is done by a screw stud 74 (Fig. 3) on which the roller is freely revoluble. The screw stud is driven into the stem 73 and the latter is affixed to the lever 65 in any suitable manner.

A bent arm 75 at that extremity of the lever 65 opposite to the one which carries the roller abutment 63 supports a locking roller 76 which is adapted to be actuated by the lever 10. For this purpose the latter carries a cam 77 (Fig. 3). There is only one of these cams and it is situated at the right extremity (Fig. 1) of the transverse bar 12. Said bar is either made deep enough or provided with an extension 78 that will accommodate one of a pair of screws 79, 80, through which the connection of the cam 77 is made with the lever 10.

The working face of the cam 77 is divided into an approach 81 and an arc 82. The latter is struck from the center of the pivot 8. Thus absolute uniformity is assured for every locked position of the abutment lever 65 as well as absolute uniformity of the gap 83 (Fig. 5) at the impression point 64. The walls of this gap, which is constrictable as later brought out, comprise the type face 55 of the selected type stationed at the point 64 and the contiguous part of the perimeter of the roller abutment 63. The mat 62 goes through and occupies this gap.

Use is made of the screws 79, 80, (Fig. 3) to regulate the width of the gap 83. A fairly heavy spring 84 presses against the back of the arm 75, thereby to keep the roller 76 in contact with the cam 77 and to tend to keep the roller abutment 63 at its farthest spaced position from the mat 62. By driving the screws 79, 80 into the extension 78 (Fig. 3) the cam 77 will be moved away from said extension, thereby to lessen the initial gap and to later cause the making of a deeper impression in the mat when the rolling-in step occurs. The depth of the type impression is thus adjusted to a fine degree, but said depth of depression will remain absolutely uniform for whatever adjustment may have been determined at the cam 77.

Now referring to the left end of the transverse bar 12 (Fig. 1) it is seen that this bar there terminates in a box 85. This box has a bore 86 (Fig. 14) which is slidably occupied by an actuating dog 87. This dog is cross sectionally noncircular (Fig. 7) to avoid the chance of its turning in the box. Each of a pair of springs 88 (Fig. 1) is anchored to a pin 89 projecting from the sides of the box. The opposite ends of these springs are anchored to the ends of a cross pin 90 which transfixes the forward end of the dog 87. The latter also carries a set collar 92 which abuts the front of the box 85 and limits the extension of the point 92 of the dog toward a toothed wheel 93 (Fig. 14).

Use is made of a brake 94 (Fig. 14) for the holding of the toothed wheel 93 in its successive positions. This brake is employed mainly to illustrate the possibility of its use, and not so much from the standpoint of necessity, because the nature of the worm drive shaft 95 can be depended upon for the dead stopping of said wheel. But on the assumption that the use of the brake 94 is desirable, there is included in the arm which denotes the brake, a tooth 96 which is held in engagement with the rim of the wheel 93 through the action of a spring 97 against a nut 98 on the screw stud 99 which depends from one extremity of the brake arm. The latter is pivoted at its other extremity by means of a screw 100 which is driven into the adjacent header 68 (Fig. 7). An adjustment of the nut 98 on the stud 99 will vary the tension of the spring 97. The latter is also utilized as a yieldable abutment for the dog 87 because when the lever 10 is restored to its initial position (a, Fig. 3) after having been elevated to the position b, said lever will pass slightly beyond said initial position as at e (Fig. 14) due to its momentum, whereupon the box 85 will strike the point of the screw 99 and absorb the shock incident to the return motion of the lever.

The worm drive shaft 95 is journaled at its ends in the headers 68, 69 (Fig. 7), its left end extending beyond the header 68 to support the toothed wheel 93 which is keyed to the shaft as at 101. Said shaft has a spiral groove 102 which suggests the name worm shaft. The carriage 70 derives its motion directly from the shaft during the act of writing, for which purpose the end standards 103, 104, are in driving contact with said shaft.

The respective standards include shoes 105, 106 (Fig. 7) which ride the contiguous top halves of the shaft 95 (Figs. 13 and 14). The shoe 105 is broader than the shoe 106 mainly in order to enlarge the bearing of the standard 103 centrally of the drive shaft. In actual practice both shoes will be of the same breadth, perhaps no thicker than the bottom terminals of the two standards. In each case the shoe includes a stud 107 (Fig. 9) which occupies the groove 102, thus to provide for the shifting of the carriage 7 when the shaft 95 is turned.

Thus it is readily seen that when the lever 10 (Fig. 3) is lifted by action of the lever 14 there will be a forward swinging of the roller abutment 63 through the instrumentality of the cam 77, as well as a turning of the shaft 95 through the instrumentality of the dog 87. The result of the turning of the drive shaft is a movement of the carriage 7 in the direction of arrow f (Fig. 7) from its starting position at the right toward an eventual stopping position at the left of the machine.

The previously mentioned bar 67 occupies openings 108 (Figs. 13 and 14) in the respective end standards 103, 104, thus to provide for the slidable support of the carriage 70. The end standards of the latter are rigidly interconnected in any suitable way, for example by a strip 110 across the front, (Figs. 6 and 7). Inasmuch as the strip 110 is on front it is used as an indicator, being calibrated at 111 in ems and ens (Fig. 7) or in such other divisions per linear inch according to the point system of measurement as may be found desirable in practice. A link 109 (Fig. 9) is pivoted to one of the end standards, for example 103, for a purpose stated later.

This indicator strip 110 is directly in front of the mat 62 (Fig. 3) so that the calibrations 111 are capable of being read in conjunction with the vertical rulings 112 on the working face 61 of said mat (Fig. 15). The vertical rulings as well as the horizontal marks 113 are provided to aid in the justification of the type impressions. In actual practice the spacing of the rulings and marks will be varied in accordance with the type sizes used. As is well known in the art of printing, type sizes are currently designated by points. This is the unit of measurement and it equals .0138 inch.

Thus, for example, the rulings and marks 112, 113, are spaced for 8-point type. By an extension of the idea the mat may be ruled and marked more finely below the 8-point type style down to the 3½-point size, or more coarsely up to the 18-point size. In any event the rulings and marks on the working face of the mat 62 should harmonize with the type size embodied in the type element 37.

A pair of rollers 114, 115, provides for the feeding of the mat 62 (Fig. 3). The back roller 114 has trunnions 116, 117, which actually constitute a roller shaft. These trunnions are journaled in the end standards 103, 104, and they carry knurled knobs 118, 119, for the purpose of turning the back roller by hand and independently of its automatic turning, for which there is provision.

Said automatic turning involves the use of a ratchet wheel 120 (Fig. 10) which is loose on the trunnion 117, but is pressed against a set collar 121 on said trunnion by a spring 122, which abuts the knob 119. The latter is screwed upon the threads 123 on the terminal of the trunnion 117, and when the knob is screwed up hard enough against the spring 122, the resulting pressure against the ratchet wheel 120 holds the latter immovable against the collar 21 and in respect to the trunnion 117. At such a time the actuation of the ratchet wheel 120 will turn the back roller 114, but when it is desired to make an adjustment of the roller in respect to any standing position of the ratchet wheel 120 then the knob 119 is backed off, first involving the necessity of holding the knob 118 so as to reduce the tension of the spring 122 and then permit the turning of the roller by means of said knob 118.

The front roller 115 is an idler. It has trunnions 124 which are turnably carried by links 125 which are pivoted at 126 to the standards 103, 104, and extend forwardly therefrom. The front roller 115 can be relied upon to maintain an appropriate degree of friction against the working face of the mat 62 merely by gravity, but in practice this may be supplemented by the obvious addition of springs that will interconnect the links with the end standards. The front roller 115 is readily raised from contact with the mat merely by taking hold of it and lifting it.

Reverting to the automatic feeding of the mat 62, attention is directed to Fig. 7 wherein the right header 69 is shown carrying a ramp 127. This ramp exercises a cam action upon a pawl 128 which has a tooth 129 (Fig. 13) in engagement with the ratchet wheel 120. The pawl 128 is carried by and guided in a bearing 130 which is part of a bracket 131 (Fig. 13) secured to the adjacent standard 104.

The latter also has pins 132 to which springs 133 are anchored at one end, the other ends of the springs being attached to pins 134 on the pawl 128. The disposition of the springs 133 is such (Fig. 13) that the pawl 128 is drawn downwardly in the bearing 130, thus to be properly positioned in reference to the ramp 127 for the action which takes place when the carriage 70 is returned to its starting position at the right (Fig. 7).

At that time the pawl 128 rides the ramp 127 (Fig. 7), the lower end of the pawl being desirably beveled at 135 to facilitate the interengagement. A clockwise turn is imparted to the back roller 114 (arrow g, Fig. 13), thereby raising the mat 62 in readiness for typing the next line. The distance between lines can be regulated by adjusting the ramp 127. For this purpose the ramp is slotted at 136 (Fig. 7) to accommodate the stem of a set screw 137 that is driven into the header 69.

A micrometer adjustment is provided for the setting of the mat 62 in exact relationship to the indicator strip 110, that is to say, provision is made of a fine adjustment whereby the rulings 112 can be registered exactly with the calibrations 111. This purpose is served by a shaft 138 (Figs. 3, 7, and 8) which is supported by the end standards 103, 104. The right end 139 (Fig. 7) can be squared or otherwise made cross sectionally non-circular so that it will not turn while being slid in the standard 104 which supports that end. The left end of the shaft 138 is threaded at 140 (Fig. 8) to occupy the threaded bore of a knob 141 which includes a sleeve terminal 142. Said terminal is revoluble in the bore 143 of the standard 103, with which it has a swivel connection by virtue of the occupancy of the point of a small screw 144 in a groove 145 around the sleeve.

Thus the turning of the knob 141 will shift the shaft 138 either one way or the other in the axial direction, thereby to shift the mat 62 in reference to the indicator strip 110, because of the grip which a pair of clips 146 carried by the shaft 138 has on the opposite margins of the mat (Fig. 7). Each of these clips includes a backpiece 147 against which the mat rests, and a front spring piece 148 which presses toward the back piece and thus exercises a degree of friction against the contiguous margin of the mat.

Regulation of the manipulation of the actuating lever 14 is secured by a control generally designated 149 (Fig. 1). This control consists of the upper and lower guides 150, 151, (Figs. 6 and 24). The upper guide 150 is essential but the lower guide is no less important because by means of it it becomes possible to accurately justify the imprinting of the type so that successive lines will be exactly the same predetermined number of ems or ens in width. Both of the guides 150, 151, comprise the arc of a circle which is struck from the axis of the shaft 19 as the center. These guides are substantially in vertical registration (Figs. 22 and 23) although this is not a prerequisite. The ends of the upper guide 150 are secured at 152 to the tops of stands 153. These are flanged at 154 (Fig. 2) and are fastened down thereat to the base 1 by means of screws 155. The front face 156 of the upper guide is set at a pitch, thus to make it easier for the operator to read the indicia 157 which are inscribed thereon (Fig. 24). Said indicia correspond with the types 54 in the element 37 so that when the front of the lever 14 is moved into registration with the desired indication on the upper guide 150, the selected type will be moved to the impression point 64 in readiness for the act of imprinting the mat.

Notches 158 (Fig. 24) are cut into the upper guide 150 to insure the registration of the lever 14 with the selected character. To this end the lever has a square hole 159 (Fig. 4) in which the cross sectionally square stem 160 (Fig. 22) is slidable. This stem has an angled point 161 (Fig. 24) which is adapted to enter the selected notch when the lever 14 is depressed. Springs 162 anchored at 163 to the sides of the lever 14 and at 164 to the sides of the stem 160 tend to normally draw the stem down and to keep its stop 165 in contact with the top of the lever (Fig. 22). But said springs are adapted to yield (Fig. 23) upon the continued downward motion of the lever 14 after engagement has been made between the guide 150 and the point 161 for a purpose presently described.

The extent of said continued downward motion can be regulated to a fine degree, and this regulation is the prime factor in justifying a line of type imprints or impressions, in other words, the prime factor in so spacing the individual imprints or impressions that the last one of a full line will end exactly on the right margin of a column. This result necessitates variations in the step motion of the carriage 70 (Fig. 9) and said variations are quickly produced by the operator during the composition of a line through the use of stop elements 166 or 167 (Figs. 25 and 27).

There is considerable opportunity for variation in the use of these elements, but in any case they are employed as inserts in the lower guide 151 (Fig. 24) to determine the arc movement of the plunger 171 on lever 14. With respect to Fig. 24, each of the notches 158 in the upper guide 150 has a matching hole 168 (Fig. 24) in the lower guide 151, obviously in a position in vertical arc alinement. The holes 168 (Fig. 24) are for the reception of pins 169 (Fig. 25) on each of the elements 166, and these elements are supplied in varying heights. Said elements are stabilized in their positions in the lower guide 151, in addition to the mutual support which their lateral contacts affords, by fins 170 which project down and contact one vertical side of the lower guide either at the front or back.

The previously mentioned plunger or equivalent abutment 171 projects from the underside of the lever 14 (Fig. 22). This plunger is in the form of a screw which is driven through the lever and has a nut 172 for locking its adjustment. A point 173 on the nether end is adapted to register with and enter either one of the holes 168 (Fig. 23) or an aperture 174 (Fig. 25) in the top face of a chosen stop element 166. It is clearly seen that the extent of the foregoing continued downward movement of the lever 14 will be determined by the height of the stop element 166 in any given type position, or of the altitude of the top face of the guide 151. A stop element 166 of less height (h, Fig. 24) than its component (i, Fig. 24) if selected for registration by the plunger 171 will permit a downward movement of the lever 14 to a greater extent than if its higher component had been selected.

Thus in the first instance there is a more pronounced elevation of the lever 10 (Fig. 14) than in the second instance, resulting in a greater angular motion of the toothed wheel 93 and drive shaft 95, and a longer step of the carriage 70 toward the left than would occur in response to the shorter downward movement of the actuating lever. The greater movement is necessary to accommodate such broad letters as m, w, etc., while the less movement agrees with the requirements of narrow letters such as i, l, etc. The stroke variations which can be achieved in the control 149 (Fig. 1) will be reflected in the step motions of the carriage 70. Therefore, all that the operator has to do is to watch the progress of the line which he is typing on the mat 62 and by consulting the vertical rulings 112 (Fig. 15) he can determine the number of points which are available to him to finish out a complete line, whereupon he will select the stop elements 166 in such manner as to effect proper spacing to secure a flush ending to the line.

It is recognized that there is the possibility of not always having available a sufficiently large supply of stop elements 166 to meet all possible demands for justification. Thus in lieu of attempting to supply numbers of sets of stop elements 166 graded in decimal sizes as to heights, provision is made for regulating the altitude of the lower guide 151. For this purpose each of the stands 153 is slotted at 175 (Fig. 2). Each slot is occupied by the respective end of the lower guide 151. A threaded hole 176 in that end has a screw 177 driven through it. The head of the screw rests upon a shoulder 178 which is defined by an enlargement of the respective stand, the other end of the screw being swiveled at 179. The effect of turning the screws is to raise or lower the guide 151, the extent of either movement being measured by a scale 180 on each of the stands 153.

Reverting to the stop elements 166, 167, it is desired to now make specific reference to Figs. 26 and 27 which illustrate the modification which the elements 167 comprise. The lower guide 151 has a series of holes as before, now designated 181, constituting the counterbores of notches 181x into which the top edge of the guide 151 is formed instead of being smooth as in Fig. 24. Said notches have matching notches 182 in the tops of the elements 167, this arrangement elevating the notches 181x, so to speak.

The latter are used to stabilize the elements 167 when emplaced upon the lower guide 151, for which purpose said elements are beveled at 183 to seat in the notches 181x when the pins 184 (Fig. 27) are fitted in the holes 181. The top notches 182 are the equivalents of the apertures 174 (Fig. 24), and are adapted to be engaged by the point 173 or some substitute for it.

As the foregoing step motions of the carriage continue the latter is eventually limited by a stop device 185 (Fig. 6). This stop device comprises a cross sectionally non-circular bar which is slidable in a correspondingly shaped opening 186 in the left header 68. The stop device is fixed in position by a set screw 187 and in order to determine the setting of the stop device graduations 188 are inscribed upon its forward face (Fig. 7) which, when registered with a chosen side of the standard 68, will produce an accurate determination of the stopping point for the carriage. These graduations will be spaced in accordance with the point system of type measurement, but in practice may be otherwise determined in accordance with the needs of the machine.

The return of the carriage 70 to its starting position at the right (Fig. 1) is accomplished conveniently by a handle 189. This handle is affixed to the front end of a shaft 190 which is supported in bearings 191 on the base 1 and extends back virtually to the end of the base. There said shaft carries a crank 192 which has pivotal connection at 193 (Fig. 9) with the free end of the previously mentioned link 109. The crank 192 and link 109 constitute an articulation between the shaft 190 and the carriage 70. Although the handle 189 is primarily intended for the return of the carriage to its starting point, it is also useable to move the carriage to the left, a necessary requirement at that time being the release of the wheel 93 (Fig. 14) from the brake 94.

Figure 20:
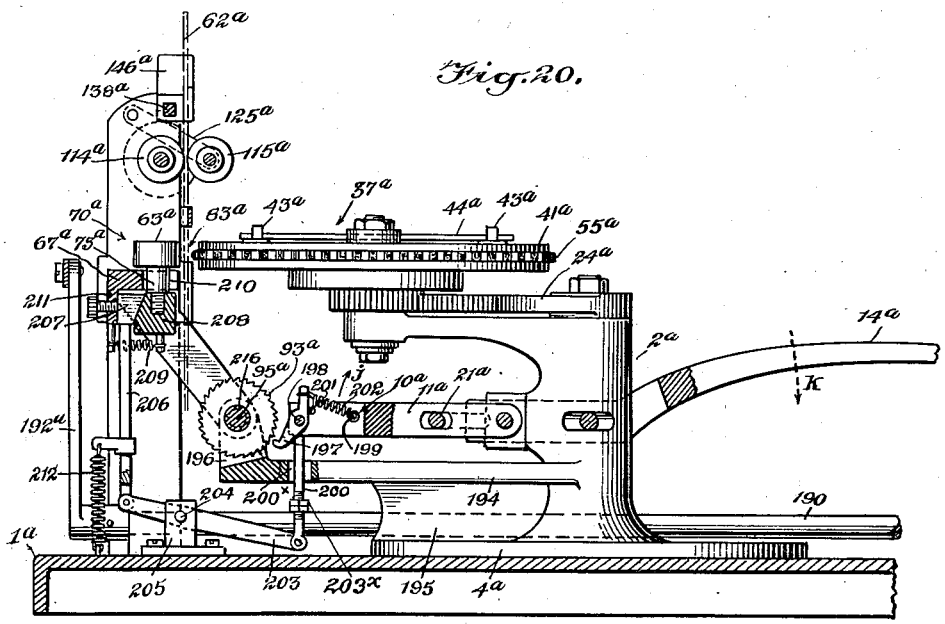
Figure 20 is a vertical section taken substantially on the line 20—20 of Fig. 19, the type element and its associated parts being included.

Figures 19 and 20 illustrate a modification of the machine largely comprising a reorganization of the basic elements for advancing the carriage during the act of imprinting or impressing a line of type, and of moving the roller abutment up to its constricting position in reference to the mat. But inasmuch as many of the elements already described are employed, said elements are designated by corresponding reference characters distinguished by the added exponent letters a without necessarily repeating all of the description. The standard 2a now has an additional extension 194 (Fig. 20) which is made rigid with the flange 4a by a web 195.

Said extension is forked at 196 for the bearing of the worm drive shaft 95a and the sequestration of the toothed wheel 93a. The latter is actuated on the upstroke of the lever 10a (arrow j, Fig. 20) by a pawl 197 which is pivoted at 198 to the back end of the lever. The latter is now confined to the central stem 11a which in place of having the transverse bar 12 and braces 13 (Fig. 1) merely accommodates the pawl 197 and restrains one end of a rod 200.

A stop pin 201 across the back end of the stem 11a limits the clockwise turning of the pawl 197 under the influence of a spring 202 which is anchored at its ends to an extension of the pawl and to another pin at 199. Thus every depression of the actuating lever 14a (arrow k, Fig. 20) will raise the lever 10a (arrow j) by virtue of the lifting function of the arcuate bridge 21a, causing a turn of the wheel 93a and an axial movement of the shaft 95a in accordance with the extent of the depression.

The same motion of the lever 10a permits the movement of the roller abutment 63a forwardly to constrict the gap 83a at the printing point under the influence of a sufficiently strong spring 212 connected to the linkage. The latter consists of a rocker 203 (Fig. 20) to one end of which the rod 200 is connected. Said rocker is pivoted at 204 to a bracket 205 on the base 1a, and has a rod 206 connected to its other end.

A cam 207 surmounts the rod 206 and is held in contact with a block 208 by means of a pair of springs 209 (Fig. 19). The contacting faces of the cam 207 and block 208 are beveled to secure the desired cam action, but the nature of the cam means for shifting the roller abutment is subject to some variation, in any event being the equivalent of the cam 77 in Fig. 3.

The roller abutment 63a has a stem 73a as before, and this stem is secured rigidly to the block 208 which thus becomes the equivalent of the lever 65 (Fig. 11) inasmuch as its movement by cam means is responsible for the advance of the roller abutment toward a constriction of the mat gap. The stem 73a is guided in a slot 210 in the bar or carriage track 67a. The latter has a flange 211 which backs the cam 207 and assures the desired cam action upon the block 208 when the rod 206 is moved downward. This movement is effected by the spring 212, the ends of which are anchored to the base 1a and to the rod 206.

Said rod 206 thus responds to the spring 212 but only as and when permitted by the lever 10a. For this purpose the upper end of the rod 200 rests against the lever 10a (Fig. 20), being held there by the spring 212. The rod 200 operates in a hole 200x in the arm 194. The upward movement of the rod 200 is necessarily of a uniform extent, despite variations in the degrees of angular motion of the lever 10a, being so limited by a stop 203x on the rod. The stop is desirably made adjustable.

The end standards 103a, 104a, of the carriage 70a ride upon the bar 67a as before, but in place of having shoes with studs that ride the spiral groove 102a of the drive shaft 95a, said standards have extensions 213, 214, (Fig. 19) in which the drive shaft is secured at its ends, as at 215. The toothed wheel 93a has a stud 216 that rides the groove, and inasmuch as the sides of the fork 196 confine the toothed wheel against axial movement, it follows that each of its turns will cause an axial movement of the driving shaft, thereby to advance the carriage 70a (arrow 1, Fig. 19), as printing progresses.

Figure 21 will be recognized as being virtually identical with the top portion of Fig. 1, the exception being the conversion of the mechanism into a typewriter or a machine for performing an equivalent function. The modification comprises the addition of a pair of inking rollers 217. These inking rollers are desirably composed of felt, and they are carried by cores 218 which are turnably mounted at 219 upon arms 220 which extend out from the standard 2b. In connection with this reference numeral it is desired to state that all numerals in Fig. 21 designating corresponding parts in the first modification are distinguished by the addition of the exponent letter b and without repeating the description.

Reverting to the inking rollers 217 (Fig. 21) it would be deemed a simple expedient to either impregnate the felt rims with ink so that the inking function will endure for a relatively long time as in the instance of a typewriter ribbon, or the machine may be supplemented by a source of ink to supply the felt rims from time to time. In any case the type faces 55b are intended to be inked so that when the selected character is brought into registration with the printing point 64b, the ensuing step motion of the carriage 70b will produce the impression upon the paper with the rolling motion, which is one of the dominant characteristics of the invention.

The operation is readily understood. It has just been stated that the production of a readable character by the use of this machine is the result of rolling the character into the mat, paper, or equivalent printable surface, as distinguished from the formation of a character in other machines such as typewriters, by a staccato or percussive motion of a type bar. This rolling-in function is a prime requisite when making a mat for stereotyping purposes. The latter is fundamental with the instant machine, but as has been pointed out, the same principle is readily diverted to equivalent uses to good advantage.

The operator sits in front of the machine and yields the actuating lever 14 by swinging it either to the right or left in reference to the control 149, periodically depressing said lever after each type selection. The indicia 157 (Fig. 24) are distributed across the face 156 of the upper guide 150 according to any prearranged plan. For example, the distribution of characters can be similar to the distribution of characters on a standard typewriter keyboard. No good purpose would be served in enlarging upon this feature because the arrangement of the indicia, whether in single letters or entire groups in word formation, is something which is entirely within the spirit of the invention. Having made a character selection on the front face 156 (Fig. 24) by appropriately swinging the lever 14, the operator presses down.

The swinging act turns the type element 37 so as to bring the selected character into registration with the printing point 64. Said printing point confronts the mat 62 and having established this condition the down pressure of the lever 14 follows, as already stated, producing the results depicted in Figs. 3 and 14.

The engagement of the angled point 161 with the upper guide 150 serves a stabilizing function. The lever 14 will be swung back and forth with considerable rapidity, making it necessary to fix the angular position at which the selected depression is to occur, and stabilize it, as has been said, so that there will not be any chance of the type element 37 vacillating on its axis 32 after the registration of the selected type face with the printing point has been established.

This function occurs upon the initial depression of the lever 14 and is completed when the angled point 161 enters the notch 158 (Fig. 24) of the selected character. The continued downward movement of the lever 14 lifts the lever 10 from its position $a$ to its position $b$ (Fig. 3). The displacement of the locking roller 76 toward the rear results in the movement of the roller abutment 63 toward the front. The confronting surfaces of this roller and of the selected type face 55 define the mat gap, and the latter becomes constricted as the roller abutment 63 advances forwardly, as stated.

Immediately following the constriction of the mat gap the actuating dog 87 (Fig. 14) reaches the toothed wheel 93 and gives it a turn. The extent of the turn is determined by the distance that the plunger 171 (Fig. 24) is permitted to move downward, and that in turn is determined by the height of the stop elements 166 or by the distance between the point 173 and the top face of the lower guide 151 in the event that there is no stop element in the particular selected type position.

After the roller abutment 63 has been driven forwardly and locked in its impressing position by the advancement of the arc 82 (Fig. 3) onto the locking roller 76, it is immaterial how much farther the lever 14 may be depressed or the toothed wheel 93 turned, because the arc 82 will simply ride over the roller 76 during these extra movements and will not disturb the abutting position of the roller 63. The locked position of the roller 63 thus comprises a fixed factor in each impressing operation which, in other words, means that the depth of the type impression is a fixed factor in each impressing operation. But the extent of the step advancement of the carriage 79 and the inescapable concomitant rolling motion of the type element 37 are successively variable factors which are determined each time by the permissive amount of movement of the plunger 171 (Fig. 24).

The foregoing turn of the toothed wheel 93, and consequently of the worm drive shaft 95, moves the carriage 79 toward the left (arrow $f$, Fig. 7). The mat 62 is firmly held in the carriage and the motion of the latter draws the mat 62 through the now constricted gap 83 (arrow $m$, Fig. 5), doing so with considerable force. Inasmuch as the roller abutment 63 is locked in position and holds the mat firmly against the type element 37, it follows that the latter will yield, and desirably so because it is this yielding that produces the rolling-in of the type character.

The yielding of the type element (arrow $n$, Fig. 5) is in the same general direction as that of the motion of the carriage. The shaft 32 (Fig. 3) does not turn, being held from doing so by the lock which the gear segment 24 affords. But the element 37 is capable of turning in reference to the locked shaft 32, doing so against the tension of the spring wire 44 which is anchored to the shaft. Upon the restoration of the actuating lever 14 to the starting position with the resulting release of the roller abutment 63 from its position of constriction of the gap, the erstwhile pressure against the type element 37 will permit the spring wire 44 to move the element 37 back to its former angular position.

Accurate work can be done by a careful following of the rulings 112 and markings 113 on the working face of the mat 62 (Fig. 15). This configuration of the working face is provided as a direct aid for the operator in determining the number of type characters and spacing left to complete a given line, the spacings being determined by the proper use of the stop elements 166, 167 (Figs. 25 and 27) in the guide 151. The right terminal of every complete line must come flush with the right margin of a column, and the foregoing aids are provided for the operator so that this result can be achieved easily and quickly. In producing a stereotype mat by means of this machine, it is possible to make a single line, which line could be cut off from the mat and used as an independent matrix for casting a single line slug in a machine adapted to such purpose.

The other details of the machine have been enlarged upon already in the body of the description, for example, the manner of making micrometer adjustments of the mat 62 laterally of the carriage 79 by use of the shaft 138 and knob 141 (Fig. 8) as well as making micrometer adjustments of the mat vertically of the carriage by use of the tension releasing knob 119 at the right (Fig. 7).

In conclusion it is desired to point out that the back of the mat 62 remains compartively smooth. In this respect it is in contrast with a stereotyping mat as currently known, because in the latter the voids between the type areas comprise relatively deep depressions which are required to be bolstered with strips of felt. This is necessary to insure a uniformity of the mat for the casting process. The instant machine produces the type impressions only, and with the exception of those instances wherein the impression is embossed, there will be little occasion for any sinking of the back of the mat nor for any consequent padding to make the mat ready for casting.

I claim:

1. A machine of the character described comprising a carriage which is adapted to carry a mat, a type element having type faces subject to registration with a printing point confronting said mat, selecting means with which to actuate the type element and so bring a selected type face into position at said point, means to then move the carriage in one direction to correspondingly move the mat past said printing point, means backing the mat and providing frictional engagement thereof with the selected type face and means establishing a yielding action in the type element in agreement with the carriage movement so that the selected type face will momentarily follow the carriage and thus produce the imprint without blurring.

2. A machine of the character described comprising a carriage which is adapted to carry a mat, a type element having type faces selectively subject to registration with a printing point confronting said mat, means to rectilinearly move the carriage a step to advance the mat that far past the printing point, abutment means backing the mat at the printing point, coacting with the selected type face to define a constricted gap through which the carriage movement draws the mat by force, and means providing for a turnable yielding of the type element thereby to roll the contour of the selected type face across the mat.

3. A machine of the character described comprising a carriage which is adapted to carry a mat, a type element having a type face registrable with a printing point confronting the working face of said mat, abutment means in back of the mat, coacting with said type face to define a gap occupied by the contiguous part of the mat, means to close the abutment means against the mat and to move the carriage rectilinearly one step thus to forcibly draw the mat through the resultingly constricted gap, and means providing for a turnable yielding of the type element thereby to roll an impression of the type face into the working face of the mat.

4. A matrix making machine comprising a carriage which is adapted to carry a stereotype mat, a series of types selectively movable to an impression point confronting the working face of the mat, means to selectively move the carriage in one direction in successive steps of variable lengths to agree with the width of successive type faces, means providing for a movement of at least the selected type simultaneously with and in the same direction as the carriage thus to avoid blurring the type character as applied to the mat, and abutment means assuming a fixed position in back of the mat and in line with the impression point at each carriage movement to insure the penetration of the type working face into the mat.

5. A matrix making machine comprising a selectively operable type element having a series of type faces, abutment means confronting a designated printing point at such element respecting which type selections are made, means embodied in said element allowing independent movement thereof across said printing point and in reference to the abutment means, a carriage adapted to carry a stereotype mat in a gap defined by a selected type face and the abutment means at said printing point, means to press the abutment means firmly against one side of the mat thereby to impress the type into the other side of the mat thus to sink the impression into one side of the mat, and means to impart a step movement to the carriage, thus to cause said independent movement of the type element and thereby lay in the type impression without slippage.

6. A matrix making machine comprising a carriage which is adapted to carry a stereotype mat, a turnable type element having a series of type faces and being situated on one side of the mat, a roller abutment on the other side of the mat in line with a designated impression point chosen in reference to the type element, means for turning said element to position a selected type at said impression point, means to drive the roller abutment hard against the respective side of the mat thus to force the selected type into the other side of the mat and make an impression, means to move the carriage one step thus to force the mat in one direction between the roller abutment and the type element thereby causing said roller abutment to roll, and means embodied in the type element allowing for yielding therein and a corresponding rolling of the selected type in reference to the mat so as to produce the impression without slippage.

7. A matrix making machine comprising a movable carriage which is adapted to carry a stereotype mat, a series of types selectively movable to an impression point confronting the working face of the mat, abutment means in back of the mat and in line with the impression point, means to successively drive the abutment means against the mat for each of a succession of typing selection and accompanying carriage movements, thus to produce a succession of type impressions, and means to uniformly lock the abutment means at each one of its driving positions against the mat thus to insure absolute uniformity in the depth of the successive impressions.

8. A matrix making machine comprising a type element having a series of type faces, a shaft for selectively actuating said element, resilient means coupling the shaft with said element and providing for movement of said element relatively to said shaft, means locking the shaft in position after a type selection, a carriage adapted to carry a stereotype mat across the face of a selected type, movable abutment means backing the mat at the impression point designated by the selected type, serving to drive the mat against the selected type face, and means to impart a step movement to the carriage thus to shift the abutment means and mat and cause yielding of said resilient means for rolling the type impression into the mat.

9. In a matrix making machine, a type element having peripheral type faces, a shaft turnably supporting said element, a spring member coupling the shaft to the element, means to turn the shaft for the advancement of a selected type face to a printing point, said turning means then serving to lock the shaft in the set position, a carriage supporting a stereotype mat in front of the selected type, abutment means in back of the mat defining a constricted gap for the mat and imposing pressure thereagainst to sink the type face into the mat, and means to impart a step movement to the carriage thereby to forcibly draw the mat through said gap and cause turning of the type element through a yielding of its spring coupling member for a rolling motion of the type face while making the impression.

10. In a matrix making machine, a type element having a peripheral series of type faces, an actuating shaft for said element having a spring coupling therewith for imparting a type-selecting motion from the shaft to said element, means locking the shaft in position after a type selection, a roller abutment in line with a designated impression point chosen in reference to a selected type face, a carriage movable transversely of said element and roller abutment supporting a stereotype mat in a gap defined by the selected type face and the confronting surface of said abutment, means to drive the roller abutment hard against the mat and to temporarily lock it in said position, thus to force the type face to make an impression in the mat, and means to move the carriage one step to forcibly draw the mat through said gap, causing a simultaneous rolling of said abutment and of the type element, the rolling of the latter occurring because of the yielding of its spring coupling in reference to the locked shaft.

11. In a matrix making machine, a carriage adapted to support a stereotype mat, a selectively operable type element in front of the mat, having a series of type faces successively registrable with an impression point at said mat, a roller abutment in back of the mat in line with said point, and cam means for successively driving the roller abutment hard against the mat and for temporarily locking the abutment in said position preparatory to perfecting the impression of the mat with the type face.

12. In a matrix making machine, a carriage adapted to support a stereotype mat, a selectively operable type element in front of the mat, having a series of type faces successively registrable with a printing point at said mat, a roller abutment in back of the mat in line with said printing point, a pivotally mounted lever carrying said abutment and normally positioned to provide an ample gap for the mat between the type element and said abutment, and cam means to turn said lever on its pivot to drive the abutment hard against the mat to constrict the gap, said cam means serving to temporarily lock the lever and abutment in position.

13. In a matrix making machine, a carriage adapted to support a stereotype mat, a selectively operable type element in front of the mat having a series of type faces successively registrable with an impression point at the mat, a roller abutment in back of the mat in line with the impression point being normally spaced sufficiently to define a gap for the passage of the mat, a pivoted abutment lever carrying said abutment and having a locking roller, and a pivoted lever having a cam engageable with the locking roller upon a movement of the respective lever, said cam having an approach to ride upon the locking roller and displace the abutment lever for a movement of the roller abutment hard against the mat, said cam having an arc then making contact with the locking roller to temporarily lock the roller abutment in said position.

14. In a matrix making machine, a carriage adapted to support a stereotype mat in an impressing position, abutment means backing the mat at a chosen impression point, a type element in front of the mat having a series of type faces, selecting means primarily operable to move the type element into a position of registration of a selected face with said point, separate means respectively operable upon a secondary operation of said selecting means first to drive the abutment means against the mat and second to shift the carriage thus to force the mat between the abutment means and the selected type face, and means yieldably supporting the type element in respect to said selecting means, thereby permitting said element to move commensurately with the carriage for a resultant rolling in of the selected type face into the mat.

15. In a matrix making machine, a carriage adapted to support a stereotype mat in an impressing position, abutment means backing the mat at a chosen impression point, a turnable type element in front of the mat having a series of type faces, selecting means primarily operable to various extents for an initial turning movement of the type element into a position of registration of a selected face with said point, said selecting means then being secondarily operable, means utilizing a fixed portion of said secondary operation to set and lock the abutment means against the mat, other means utilizing a succeeding but variable portion of said secondary operation for producing a variable step motion of the carriage, thus to forcibly draw the mat between said abutment means and selected face, and means then enabling the type element to automatically partake of a secondary turning movement thus to roll in the selected type face into the mat commensurately with said carriage step motion.

16. In a matrix making machine, a carriage adapted to support a stereotype mat in an impressing position, abutment means backing the mat at a chosen impression point, a type element in front of the mat having a series of type faces, selecting means subject to a primary selecting operation and a secondary impressing operation, means actuated by the selecting means in its primary operation to move the type element into a position of registration of a selected face with said point, means operable to a fixed extent upon the initial portion of said secondary operation to drive the abutment means against the mat and lock it there, and other means operable upon a variable portion of the succeeding secondary operation of the selecting means to shift the carriage with a correspondingly varying step motion without disturbing the locked position of the abutment means relatively to the chosen impression point.

17. In a matrix making machine, a carriage adapted to support a stereotype mat in an impressing position, abutment means backing the mat at a chosen impression point, a type element in front of the mat having a series of type faces, selecting means constituting the common actuator for the type element, abutment means and carriage, independent instrumentalities severally identified with the type element, abutment means and carriage successively operable by said selecting means first to produce a variable type selection of said type element, second, to produce an invariable position of the abutment means hard against the mat, and third, to produce a variable step motion of the carriage to draw the mat between the abutment means and the selected type face, and means turnably supporting the type element in respect to said selecting means, thereby accomplishing a rolling in of the selected type face into the mat commensurately with the drawing motion of the mat.

18. In a matrix making machine, a carriage adapted to support a stereotype mat in an impressing position, abutment means backing the mat at a chosen impression point, a type element in front of the mat having a series of type faces, selecting means subject to two independent movements, means operable thereby by virtue of the first movement to adjust the type element into a position of registration of a selected face with said point, separate means successively operable during the period of the second movement of said selecting means, respectively to drive the abutment means against the mat and lock it in position and then to shift the carriage to pull the mat between the abutment means and the selected type face, and a yieldable mounting for the type element enabling turning movement of said element and a consequent rolling in action of the selected type face.

19. In a matrix making machine, a carriage adapted to support a stereotype mat in an impressing position, abutment means backing the mat at a chosen impression point, a type element in front of the mat having a series of type faces, selecting means constituting the common operator of the carriage, abutment means and type element, and being subject to two independent movements, means actuated during the first movement of the selecting means to set the type element in a position of registration of a selected face with said point, means actuated by a portion of the second movement of said selecting means to drive the abutment means against the mat and lock it in position, means actuated by the remainder of the second movement of said selecting means to shift the carriage and force the mat between the abutment means and the selected type face, and a yieldable mounting for the type element enabling turning movement of said element away from its setting and a consequent rolling in action of the selected type face.

20. In a matrix making machine, a carriage adapted to support a stereotype mat in an impressing position, abutment means backing the mat at a chosen impression point, a type element in front of the mat having a series of type faces, selecting means constituting the common operator of the carriage, abutment means and type element, and being subject to two independent movements, means actuated during the first movement of the selecting means to set the type element in a position of registration of a selected face with said point, means actuated by a portion of the second movement of said selecting means to drive the abutment means against the mat and lock it in position, means actuated by the remainder of the second movement of said selecting means to shift the carriage and force the mat between the abutment means and the selected type face, a yieldable mounting for the type element enabling turning movement of said element away from its setting and a consequent rolling in action of the selected type face, and means capable of variably obstructing said remaining second movement thereby to vary the extent of shifting of the carriage.

21. In a matrix making machine, a carriage adapted to support a stereotype mat, abutment means backing the mat, a selectively operable type element in front of the mat having a series of type faces of various breadths, means operable to shift the carriage in successive step motions past successively selected type faces at an impression point, a plurality of stop elements of various sizes to obstruct the operation of said means at various extents of operation, thus to vary the step motions of the carriage in agreement with the varying breadths of the selected type faces, and holding means upon which said stop elements are interchangeably supported in obstructing positions, thus to vary the extent of operation of said operating means in any selected position of the type element.

22. In a matrix making machine, a carriage adapted to support a stereotype mat, abutment means backing the mat, a type element in front of the mat having a series of type faces of varying breadths, means operable to shift the carriage with a succession of steps to match successively selected type faces brought into registration with an impression point, at least one guide in respect to which said operating means is movable to produce said carriage movement, and means stationed at different places on the guide, being of various sizes to limit the permissive extent of operation of said operating means and so determine the lengths of the carriage step motions in accordance with the breadths of the selected type faces.

23. In a matrix making machine, a carriage adapted to support a stereotype mat, abutment means backing the mat, a type element in front of the mat having a series of type faces of various breadths, being selectively operable to register selected faces with an impression point at the mat, means operable to shift the carriage past said element with a step motion to meet successively selected faces at said point, a lever included in said operating means, a guide in reference to which the lever is movable to cause the stepping of the carriage, and a series of stop elements arranged along the guide, being of various sizes to intercept the lever at various extents of movement, thus to vary the length of the carriage steps in agreement with the breadth of the selected type faces.

24. In a matrix making machine, a carriage adapted to support a stereotype mat, abutment means backing the mat, a type element in front of the mat having a series of type faces of various breadths, being selectively operable to register selected faces with an impression point at the mat, means operable to shift the carriage past said element with a step motion to meet successively selected faces at said point, a lever included in said operating means, a guide in reference to which the lever is movable to cause the stepping of the carriage, a series of stop elements arranged along the guide, being of various sizes to intercept the lever at various extents of movement, thus to vary the length of the carriage steps in agreement with the breadths of the selected type faces, and means for adjusting the said guide, thereby to further vary the permissive extent of movement of the lever for any given position of the type element.

25. In a matrix making machine, a carriage adapted to support a stereotype mat, abutment means backing the mat, a turnable type element in front of the mat having a series of type faces selectively registrable with an impression point at the mat, a shaft having gearing coupled with said element for causing the turning, abutment shifting means for imposing the abutment means against the mat at a respective type selection, a pivoted lever having means for actuating said abutment shifting means, and an actuating lever pivoted to the shaft crosswise thereof, and having a lifting bridge in engagement with the first lever, said actuating lever being primarily turnable in one direction to move the type element to the selected position, and secondarily movable in another direction to swing the first lever.

26. In a matrix making machine, a carriage adapted to support a stereotype mat, abutment means backing the mat, a selectively operable type element in front of the mat having a series of type faces individually registrable with an impression point at the mat, a worm drive shaft coupled to the carriage for producing a requisite movement, a toothed wheel attached to the shaft, an abutment means carrying device which is operable to press the abutment means against the mat, and a swingable lever having a cam and an actuating dog respectively and successively to operate said device and to turn said wheel.

27. In a matrix making machine, a carriage adapted to support a stereotype mat, abutment means backing the mat, a type element in front of the mat having a series of type faces selectively registrable with an impression point at the mat, a worm drive shaft and means for its attachment to the carriage, a toothed wheel mounted on the shaft and means by which said wheel is held relatively stationary, said wheel having a driving connection with the shaft, a cam block carried by the abutment means, a cam to actuate the block for the displacement of the abutment means, and selecting means having instrumentalities for successively actuating the type element for a type selection, then actuating the cam for a displacement of the block to drive the abutment means against the mat, and finally turning the toothed wheel to displace the drive shaft and shift the carriage.

28. In a matrix making machine, a carriage adapted to support a stereotype mat in an impressing position, abutment means backing the mat, a selectively operable type element in front of the mat having a series of type faces of varying breadths, means operable to shift the carriage with successive step movements thereby to periodically draw said mat between the abutment means and various type faces successively registered with an impression point, a yieldable mounting for the type element enabling a turning movement of said element at any of its successive registrations with the impression point thus to produce a rolling in action with the drawing of the mat, a member carried by said operable means and having a contact point, and stop elements located in fixed relationship to said operable means, being of various sizes in order to vary the degree of operation of said last means and thus to vary the length of the steps of said carriage in accordance with the breadth of the selected type face.

29. In a machine of the character and for the purposes described, a carriage adapted to support a stereotype mat, a selectively operable type element in front of the mat having a series of type faces successively registrable with an impression point at said mat, a roller abutment in back of the mat in line with said point, cam means for successively driving the roller abutment hard against the mat and for temporarily locking the abutment in said position preparatory to perfecting the impression of the mat with the type face, and means for altering the position of the cam means in reference to the roller abutment thereby to regulate the depth of the impression of said type face in the mat.

30. In a matrix making machine, a carriage adapted to support a stereotype mat, abutment means backing the mat, a selectively operable type element having type faces of various breadths successively registrable with an impression point at the mat, means operable to move the carriage with a step motion to match the successive type selections, a movable lever included in said operable means and having an abutment, a guide in reference to which the lever is movable to cause the stepping of the carriage, said guide being notched for every position of the type element, and correspondingly notched stop elements of varying heights as determined by the type face sizes distributed over the guide and seating in the notches thereof, said elements variably intercepting the abutment of said lever thus to vary the movements of the lever and the resulting step lengths of the carriage in accordance with the breadths of the type faces selected at said impression point.

31. A machine of the character described comprising a carriage which is adapted to carry a mat, abutment means backing the mat, being initially spaced therefrom, a type element in front of the mat, having type faces subject to registration with a printing point confronting said mat, manual means successively operable in each of a plurality of planes, means actuated by said manual means upon movement thereof in one of said planes, for registering a chosen type face with said printing point, means actuated by said manual means during an initial portion of a succeeding movement thereof in another plane to force the abutment means toward the type element and produce a constricted mat gap, means acting under a concluding portion of said succeeding movement of said manual means to shift the carriage past the type element, and means embodied in said element allowing limited local movement of said element so that the type face can follow the carriage for the duration of said shift of the carriage.

EDWARD C. LAMPSON.